UNITED STATES PATENT OFFICE.

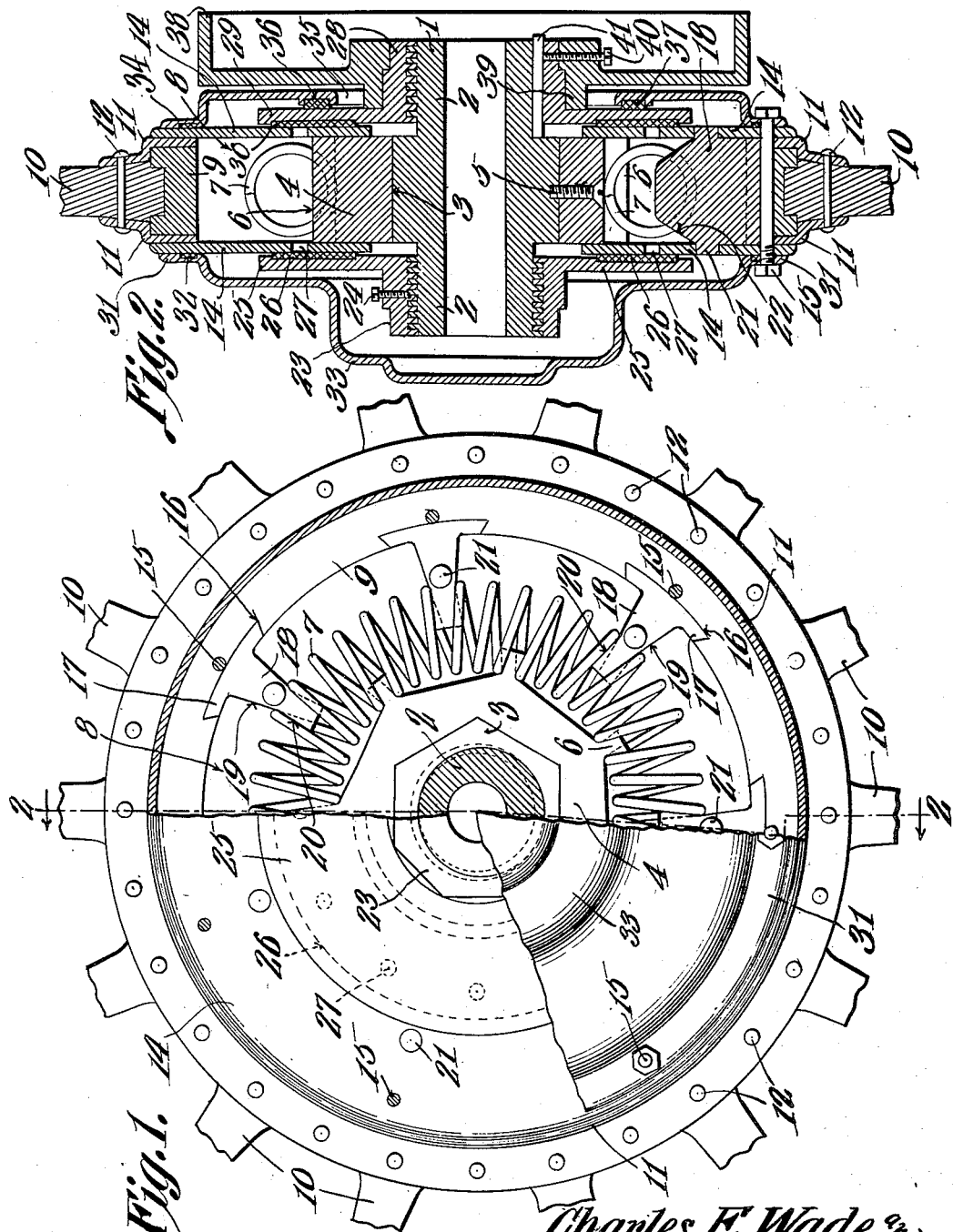

CHARLES E. WADE, OF MASONVILLE, AND CHARLES J. LAGERWALL, OF NEW YORK, N. Y.

WHEEL.

1,057,902.          Specification of Letters Patent.          Patented Apr. 1, 1913.

Application filed November 2, 1911. Serial No. 658,162.

*To all whom it may concern:*

Be it known that we, CHARLES E. WADE. and CHARLES J. LAGERWALL, citizens of the United States, residing, respectively, at Masonville and New York, in the counties of Delaware and New York, State of New York, have invented a new and useful Wheel, of which the following is a specification.

The objects of the present invention are to provide a spring wheel, the inner and outer parts of which are of novel and improved construction, to serve as places of attachment for the resilient means whereby the said parts are spaced.

A further object of the invention is to provide a spring wheel which will be dust-proof and be self-lubricating.

A further object of the invention is to improve generally, and to increase the strength of, devices of the type to which the present invention appertains.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings,—Figure 1 shows the invention in side elevation, parts being broken away; and Fig. 2 is a transverse section upon the line 2—2 of Fig. 1.

The invention includes concentric, spaced, inner and outer parts, each having elements adapted to engage with the resilient means whereby the said parts are held in spaced relation to each other.

*The inner part.*—The inner part of the wheel includes a hub 1 having oppositely extended, threaded ends 2, between which is located a polygonal, and preferably hexagonal central portion 3. Fitting closely upon the hexagonal portion 3 of the hub 1 is a spider 4, the periphery of which is of hexagonal contour. The spider 4 is held assembled with the portion 3 of the hub 1 by means of a set screw 5, seen most clearly in Fig. 2. The spider 4 is provided, at its angles, with outstanding, radial lugs 6, the adjacent faces of which diverge as they extend inwardly, to engage properly between the convolutions of an annular spring 7, of helical form, the spring 7 surrounding the periphery of the spider 4. The spring 7 is located in a spring chamber 8 which is ordinarily, although not necessarily, filled with a lubricant.

*The outer part.*—The outer part of the wheel includes a ring 9, constituting a rim carrying spokes 10, located between spoke flanges 11 applied to the opposite side faces of the rim 9, the spoke flanges 11 being secured to the spokes 10, by means of rivets 12 or other securing elements adapted to a like end. Cover plates 14 are applied to the outer faces of the spoke flanges 11, these cover plates 14 being maintained in place by means of bolts 15, passing through the cover plates, through the spoke flanges 11, and through the rim 9. The cover plates 14 fit closely against, and are adapted to slide upon, the side faces of the hexagonal spider 4 which constitutes a portion of the inner part of the hub. The spoke flanges 11 and the ring 9 are dove-tailed, as shown at 16, to receive the transverse heads 17 upon the outer ends of bosses 18, projecting inwardly, in radially disposed relation, toward the axis of the wheel. In the vicinity of the ring 9, the adjacent faces of the bosses 18 converge as shown at 19, but adjacent the free ends of the bosses, their adjacent faces diverge, as shown at 20. The bosses 18 are positioned properly to engage between the convolutions of the spring 7, and the particular disposition of the faces 19 and 20 serves to make secure the engagement between the bosses and the spring. The bosses 18 are equipped upon their side faces with outstanding projections 21, adapted to register in openings in the cover plates 14, thus promoting the security of the attachment between the cover plates and the peripheral portion of the wheel. As clearly shown in Fig. 2, the side faces 22 of the bosses converge toward the median plane of the wheel, so that the bosses may not interfere unduly with the resilient action of the spring 7.

Upon one outer end 2 of the hub 1 is threaded a nut 23, held in place by a set screw 24, the nut 23 having a flange 25 lying along the outer face of one of the cover plates 14. This flange 25 is equipped with an annular recess adapted to receive a packing ring 26, bearing against the corresponding cover plate 14, there being an opening through the cover plate 14, denoted by the numeral 27, which opening will serve to permit the lubricant which is within the spring chamber 8, to come into contact with the packing 26, and thus to lubricate the packing, as it moves upon the corresponding cover plate 14. Threaded upon the opposite end 2 of the hub 1, is a nut 28, equipped with a flange 29, adapted to lie along the outer face of the other cover plate 14, the flange 29 having an annular recess adapted to receive a packing ring 30, bearing against the cover plate 14, the packing 30 being lubricated, as before, through the openings 27, which are fashioned in the cover plate 14 with which the packing 30 coöperates.

A dust shield 31 fits against one of the cover plates 14, the dust shield 31 being recessed to receive a packing 32, fitting against the corresponding cover plate 14. The dust shield 31 is bulged, as shown at 33, to receive one end of the hub of the wheel. To the opposite cover plate 14, another dust shield 34 is applied, the dust shield 34 being open adjacent its axis, as shown at 35. The shields 31 and 34 are held assembled with the outer part of the wheel, by means of the bolts 15, hereinbefore referred to. The dust shield 34 is recessed as shown at 36, about the opening 35, to receive a packing ring 37 which bears against the adjacent cover plate.

Mounted upon the nut 28 is a brake drum 38, having a hub 39 projecting inwardly through the opening 35 in the dust shield 34. The brake drum 38 is held assembled with the nut 28 by means of a set screw 40, this set screw 40 serving, moreover, to hold in place, a key 41 which is inserted between the hub 1 and the nut 28, to hold these elements assembled. That side of the wheel which is equipped with the brake drum 38 remains permanently closed, all adjustments ordinarily being made from the opposite side of the wheel, by removing the dust shield 31.

In practical operation, the spring 7 will serve to hold the inner and outer parts of the wheel spaced apart, the bosses 18 and the lugs 6, both of which engage the spring 7, serving to prevent the outer part of the wheel from creeping circumferentially about the wheel.

The wheel herein disclosed will be self-lubricating, and the construction is such that the wheel may readily be taken down, to provide for the examination and renewal of broken or worn parts.

Having thus described the invention, what is claimed is:—

1. A wheel comprising spaced inner and outer parts; a helical spring disposed in annular form, and located between the said parts; and radial wedge shaped elements upon said parts, engaged between the convolutions of the spring to effect a compression of the spring.

2. A wheel comprising a hub having a polygonal portion; a spider engaged against rotation upon the polygonal portion of the hub, the spider being equipped with outstanding, wedge-shaped lugs; a ring; wedge-shaped bosses carried by the ring; and an annular helical-spring located between the spider and the ring, the convolutions of the spring being engaged by the narrower ends of the lugs and by the narrower portions of the bosses.

3. A wheel comprising spaced inner and outer parts overlapped upon each other; a spring located between the parts to maintain the same normally separated, the space between said parts being adapted to receive a lubricant, and there being an opening in one of said parts, permitting the lubricant to enter between the overlapped faces of said parts and a packing extended across the opening.

In testimony that we claim the foregoing as our own, we have hereto affixed our signatures in the presence of two witnesses.

CHARLES E. WADE.
CHARLES J. LAGERWALL.

Witnesses as to the signature of Charles E. Wade:
FOSTER T. RYDER,
FRANK L. DEON.

Witnesses as to the signature of Charles J. Lagerwall:
CHARLES DEGEN,
MILTON L. BERNSTEIN.